(12) United States Patent
Katakura et al.

(10) Patent No.: US 6,640,179 B2
(45) Date of Patent: Oct. 28, 2003

(54) VEHICLE DRIVE FORCE CONTROL

(75) Inventors: Shusaku Katakura, Yokosuka (JP); Daisuke Yoshinoya, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 09/984,703

(22) Filed: Oct. 31, 2001

(65) Prior Publication Data

US 2002/0065597 A1 May 30, 2002

(30) Foreign Application Priority Data

Nov. 29, 2000 (JP) ........................... 2000-363131

(51) Int. Cl.$^7$ .................. B60K 41/10; B60K 41/02; B60L 11/14
(52) U.S. Cl. ................. 701/54; 701/55; 477/43
(58) Field of Search .................. 701/54, 55, 64, 701/84, 87; 477/43, 46, 169, 110, 101; 123/361, 399

(56) References Cited

U.S. PATENT DOCUMENTS

| | | | |
|---|---|---|---|
| 5,133,227 A | * 7/1992 | Iwatsuki | ............... 74/859 |
| 5,413,540 A | * 5/1995 | Streib et al. | ........... 477/43 |
| 5,665,029 A | * 9/1997 | Minowa et al. | ........ 477/168 |
| 5,833,570 A | * 11/1998 | Tabata et al. | ............ 477/3 |
| 6,066,070 A | * 5/2000 | Ito et al. | ............... 477/43 |
| 6,360,154 B1 | * 3/2002 | Krenn et al. | ............. 701/54 |

FOREIGN PATENT DOCUMENTS

JP 01-206144 8/1989

* cited by examiner

Primary Examiner—Tan Q. Nguyen
Assistant Examiner—Dalena Tran
(74) Attorney, Agent, or Firm—Foley & Lardner

(57) ABSTRACT

An automatic transmission (5) converts the output torque of an engine (4) into a drive torque for the vehicle. The automatic transmission (5) is provided with a first gear and a second gear which has a smaller speed reduction ratio than the first gear. The gears are selectively applied according to the vehicle speed and the accelerator pedal depression amount. A controller (3) stores a first map (11, 12) which prescribes the transmission target output torque with the first gear according to the vehicle speed and the depression amount, and a second map (12, 13) which prescribes the transmission target output torque with the second gear according to the vehicle speed and the depression amount. The first map applies a larger transmission target output torque than the second map at a given vehicle speed and depression amount. The transmission target output torque is calculated by looking up either of these maps corresponding to the gear applied by the automatic transmission (5). Thus saturation of the transmission target output torque can be prevented by controlling the output torque of the engine (4) based on the transmission target output torque thus obtained.

9 Claims, 12 Drawing Sheets

VEHICLE DRIVE FORCE CONTROL

FIELD OF THE INVENTION

This invention relates to engine output control for a vehicle provided with an automatic transmission.

BACKGROUND OF THE INVENTION

Tokkai Hei 1-206144 published by the Japanese Patent Office in 1989 discloses a hysteresis region provided in the upshift and downshift timing for an automatic transmission of a vehicle.

The shift timing of the automatic transmission is determined using the vehicle speed and the depression amount of the accelerator pedal as parameters. However when these parameters repeatedly fluctuate across the shift timing, the automatic transmission repeats a shift operation which results in a chattering phenomenon. The hysteresis region above has the function of preventing such chattering.

The operation of the hysteresis region allows a shift from a second gear to a third gear during acceleration for example to be performed at a greater vehicle speed than a shift from a third gear to a second gear during deceleration.

SUMMARY OF THE INVENTION

The drive force of a vehicle, that is to say, the output torque of the automatic transmission has an upper limit according to the gear ratio that the transmission applies.

For example, the upper limiting value of the output torque in the third gear is smaller than the upper limiting value of the output torque in the second gear. Thus even the accelerator pedal is depressed in a hysteresis region immediately before the automatic transmission shifts from the third gear to the second gear during deceleration, the output torque of the automatic transmission only increases to the upper limiting value in the third gear.

In other words, after the output torque of the automatic transmission reaches the upper limiting value, the output torque does not increase even with further depression of the accelerator pedal. In the following description, this state is termed saturation of output torque. Saturation of output torque causes the driver to feel that acceleration is not sufficient. Furthermore even when output torque is saturated, the driver will often attempt to increase the output torque by depressing the accelerator pedal further. As a result, there is a tendency for the throttle to become fully open when this is not required. When the throttle is fully open, fuel consumption by the engine increases and as a result exhaust emission performance deteriorates.

On the other hand, in the second gear, it is possible to obtain an output torque which is larger than the third gear. In order to solve the above problems, therefore, it has been proposed to advance the timing of a downshift from the third gear to the second gear during deceleration. However advancing the downshift timing tends to cause chattering in the shift operation and obviates the reason for setting the hysteresis region.

It is therefore an object of this invention to avoid saturation of the output torque of an automatic transmission when the acceleration pedal is depressed.

In order to achieve the above object, this invention provides a vehicle drive system comprising an accelerator pedal, a sensor which detects a vehicle speed, a sensor which detects a depression amount of the accelerator pedal, an engine varying an output torque in response to a signal, and an automatic transmission converting the output torque of the engine into a drive torque of a vehicle.

The transmission is provided with a first gear and a second gear which has a smaller speed reduction ratio than the first gear. The first gear and second gear are selectively applied according to the depression amount and the vehicle speed.

The system further comprises a sensor which detects the gear applied by the automatic transmission and a programmable controller programmed to store a first map prescribing a transmission target output torque with the first gear according to the depression amount and the vehicle speed, and a second map prescribing the transmission target output torque with the second gear according to the depression amount and the vehicle speed.

Herein, the characteristics of the maps are set such that the transmission target output torque prescribed by the first map is larger than the transmission target output torque prescribed by the second map with respect to the same vehicle speed and the same depression amount.

The controller is further programmed to calculate the transmission target output torque based on the vehicle speed and the depression amount by looking up either of the first map and second map corresponding to the gear which is applied by the automatic transmission, calculate an engine target output torque based on the transmission target output torque, and output the signal corresponding to the engine target output torque to the engine.

The details as well as other features and advantages of this invention are set forth in the remainder of the specification and are shown in the accompanying drawings.

DESCRIPTION OF THE PREFERRED EMBODIMENTS

Figure 1:
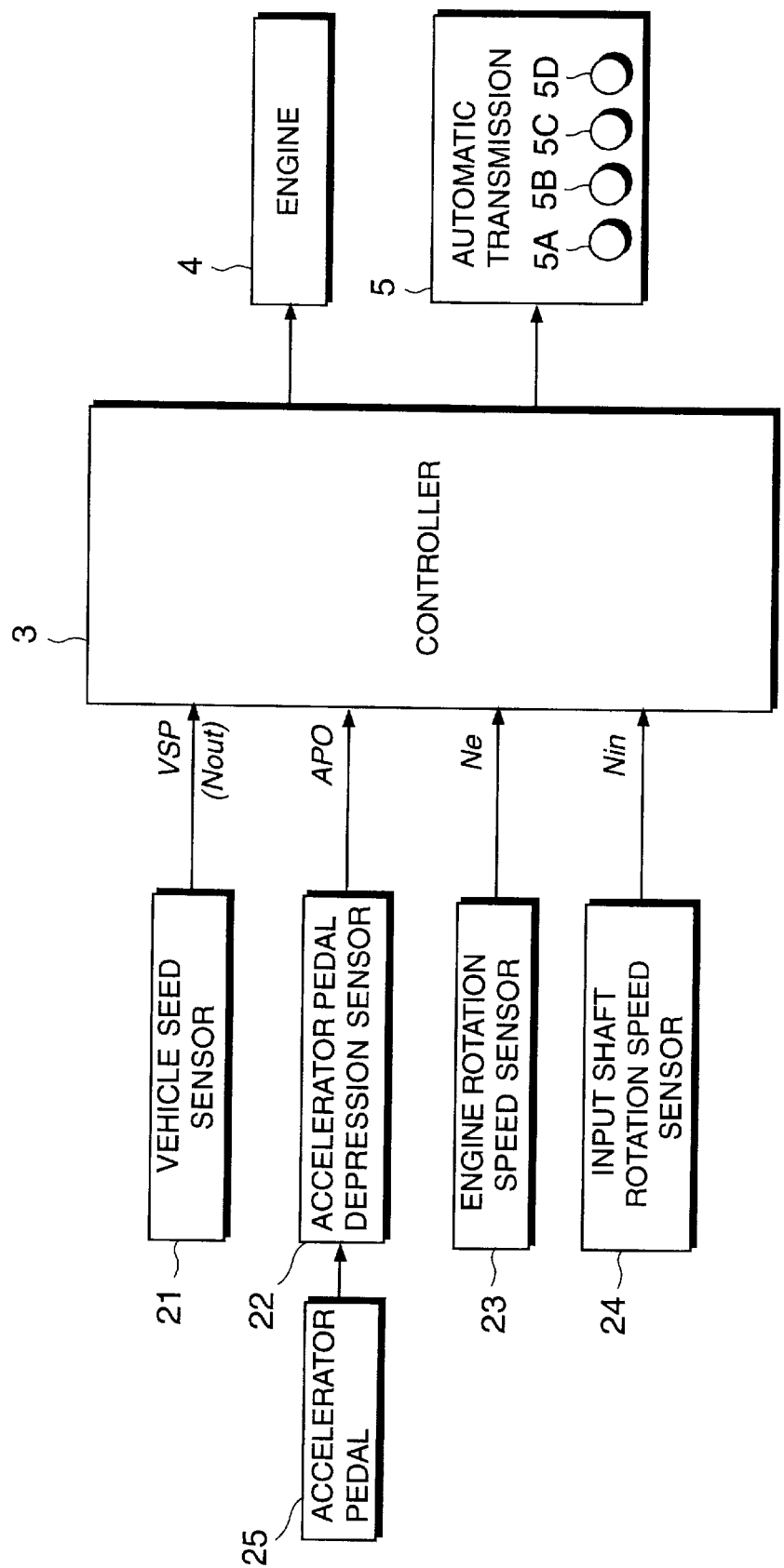
FIG. 1 is a block diagram showing the structure of a vehicle drive system according to this invention.

Referring to FIG. 1 of the drawings, a vehicle drive system is provided with an engine 4 and an automatic transmission 5 connected to the engine 4.

The automatic transmission 5 is provided with an input shaft for inputting the output force of the engine and an output shaft which is engaged to the drive system of the vehicle. The automatic transmission 5 has four gear settings, i.e., a first gear 5A, second gear 5B, third gear 5C and fourth gear 5D for driving the vehicle forward. These gear settings are selectively applied in response to signals from a controller 3. The first gear 5A is the so-called low gear and has the largest speed reduction ratio. The fourth gear 5D is the so-called top gear and has the smallest speed reduction ratio.

The rotation output of the engine 4 is input to the automatic transmission 5 through a torque converter. The controller 3 varies the output torque of the engine 4 by varying the ignition timing of the spark plugs provided in the engine 4, the throttle opening in the engine 4 and the fuel supply amount to the engine 4 in response to signals.

The controller 3 comprises a microcomputer or plural computers each of which is provided with a central processing unit (CPU), a read only memory (ROM), a random access memory (RAM) and an input/output interface (I/O interface).

Signals from a vehicle speed sensor 21 which detects a vehicle speed VSP, an accelerator pedal depression sensor 22 which detects a depression amount APO of an accelerator pedal 25 provided in the vehicle, an engine rotation speed sensor 23 which detects a rotation speed Ne in the engine 4 and an input rotation speed sensor 24 which detects an input rotation speed Nin of the automatic transmission 5 are input into the controller 3. Since the ratio of the vehicle speed VSP and the output shaft rotation speed Nout of the automatic transmission 5 is fixed, the output of the vehicle speed sensor 21 can also be used as an output shaft rotation speed Nout by multiplication with a predetermined constant K. The constant K is determined by a radius of tires of the vehicle and a gear ratio of a final gear which is interposed between the automatic transmission 5 and the tires.

Based on the signals input from these sensors, the controller 3 selects a gear to be applied by the automatic transmission 5 and controls the output torque of the engine 4.

Figure 2:
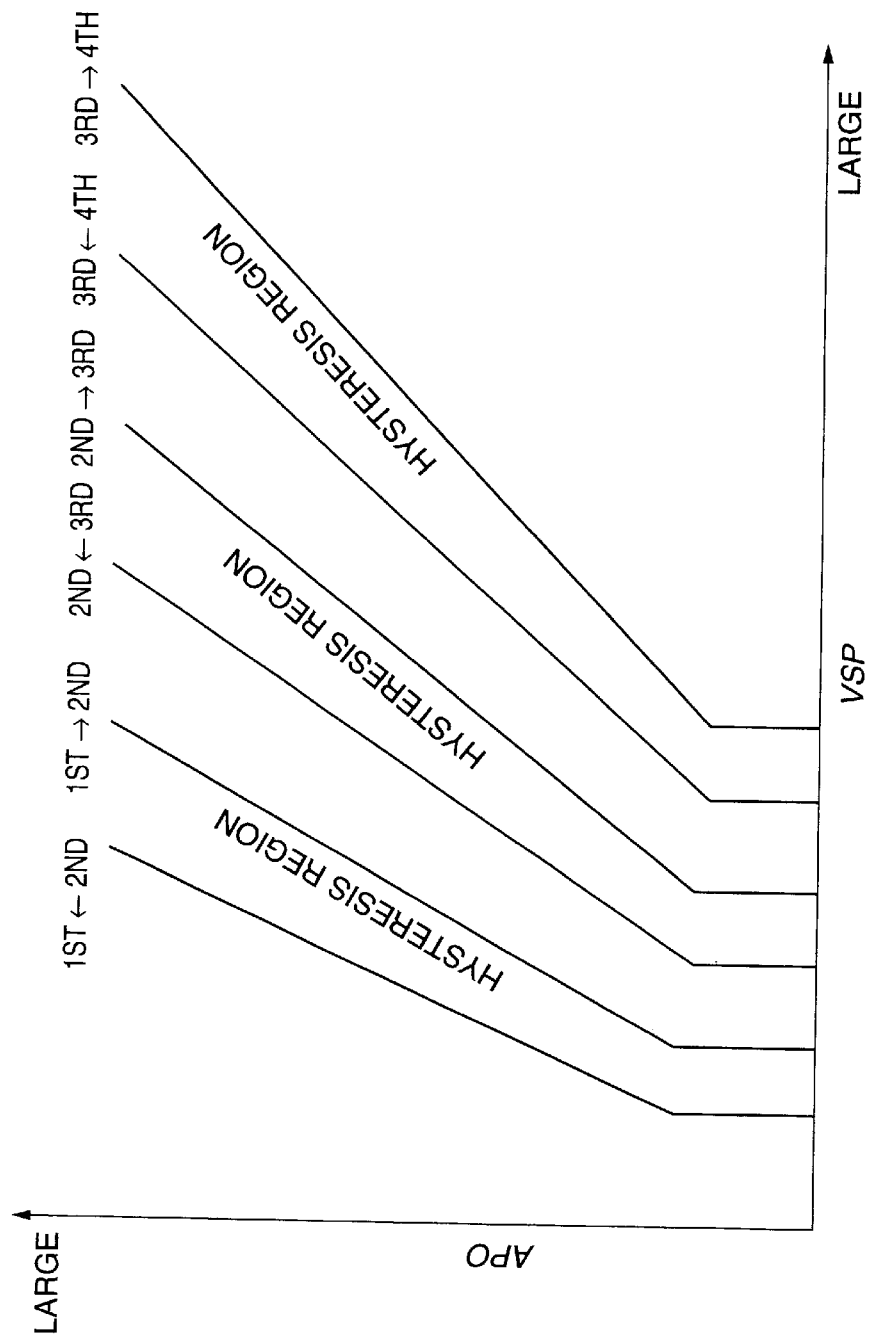
FIG. 2 is a diagram describing a map of shift timings of an automatic transmission stored in a controller according to this invention.

The controller 3 selects a gear to be applied by the automatic transmission 5 by looking up a map shown in FIG. 2 based on the vehicle speed VSP and the accelerator pedal depression amount APO. This map displays different characteristics during upshift and downshift of the automatic transmission 5. That is to say, at the same vehicle speed VSP, an accelerator pedal depression amount APO corresponding to a downshift operation between two arbitrary adjacent gears is greater than an acceleration depression amount APO corresponding to an upshift operation between the same two gears. In other words, a vehicle speed corresponding to an upshift operation between two arbitrary adjacent gears is greater than a vehicle speed corresponding to a downshift between the same two gears at the same accelerator pedal depression amount APO.

The differences in these characteristics correspond to the hysteresis in the upshift and the downshift. The controller 3 outputs a signal corresponding to the selected gear to the automatic transmission 5. The automatic transmission 5 performs a gear shift in response to this signal.

Figure 3A:
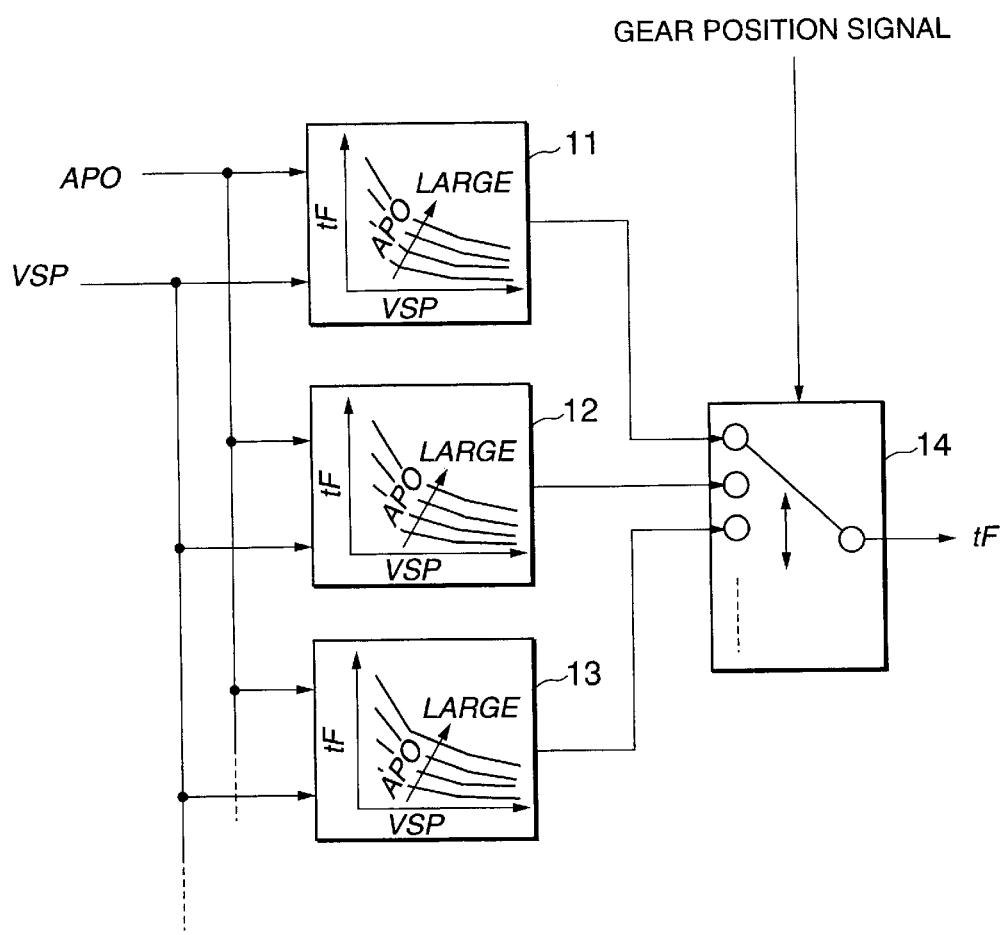
FIGS. 3A and 3B are block diagrams describing the process of engine output control performed by the controller.

The controller 3 sets a target output torque tF for an automatic transmission 5 with the process shown in FIG. 3A.

Referring to FIG. 3A, a target output torque tF for the automatic transmission 5 is calculated from the vehicle speed VSP and the accelerator pedal depression amount APO by looking up a plurality of pre-stored maps. These maps prescribe the value for the target output torque tF in each gear applied by the automatic transmission 5 in response to the vehicle speed VSP and the accelerator pedal depression amount APO. For example, the map 11 prescribes the target output torque tF in a first gear, the map 12 prescribes the target output torque tF in a second gear and the map 13 prescribes the target output torque tF in a third gear. The characteristics of the maps are set so that the target output torque tF of a lower gear is larger than that of a higher gear at the same vehicle speed VSP and accelerator pedal depression amount APO. These maps are pre-stored in the ROM of the controller 3.

The switching section 14 in the controller 3 sets a target output torque tF by looking up a map corresponding to a gear signal input from the inhibitor switch 26.

The reason that a plurality of different maps is provided is as follows.

The gears applied by the automatic transmission 5 are determined based on the vehicle speed VSP and the accelerator pedal depression amount APO as described above. However a hysteresis region is provided in the upshift and downshift timing. As a result, in the hysteresis region, different gears are applied depending on the direction of gearshift in the automatic transmission 5 at the same vehicle speed VSP and accelerator pedal depression amount APO.

Figure 4:
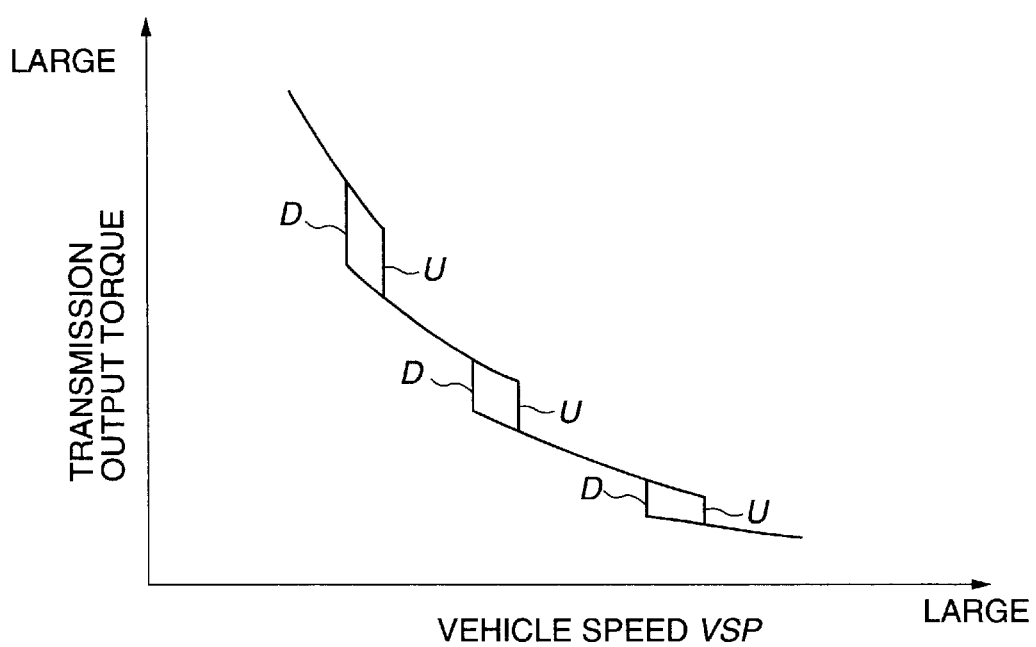
FIG. 4 is a diagram showing the variation in an output torque of the automatic transmission at a predetermined accelerator pedal depression amount.

FIG. 4 shows variation in the output torque of the automatic transmission 5 when the automatic transmission 5 performs a gear shift on the basis of the map shown in FIG. 2 in response to vehicle speed VSP at a fixed accelerator pedal depression amount APO. The line U in the figure shows the variation in the output torque of the automatic transmission 5 resulting from an upshift. The line D shows variation in the output torque of the automatic transmission 5 resulting from a downshift. The substantially parallelogram-shaped regions bordered by the line U and the line D are hysteresis regions.

In the hysteresis region, different gears are applied according to the direction of variation in the vehicle speed VSP. As shown in the figure, the output torque of the automatic transmission 5 undergoes considerable variation due to the applied gear. Generally the output torque of the automatic transmission 5 increases as the accelerator pedal 25 is depressed. However the maximum value thereof undergoes considerable variation depending on the gear which is used and the maximum value of the output torque decreases as the consecutively high-speed gears with small speed ratios are applied. The output torque of the automatic transmission 5 reaches a maximum value not only when the accelerator pedal depression amount APO reaches a maximum value of 8/8. When high-speed gears are used, before the accelerator pedal depression amount APO reaches the maximum value, the output torque of the automatic transmission 5 becomes saturated.

In order to prevent torque saturation, before the accelerator pedal depression amount APO reaches the maximum value of 8/8, it is necessary to control the output torque of the engine 4 so that the output torque of the automatic transmission 5 does not reach the maximum value before the accelerator pedal depression amount APO reaches the maximum value.

Figure 5:
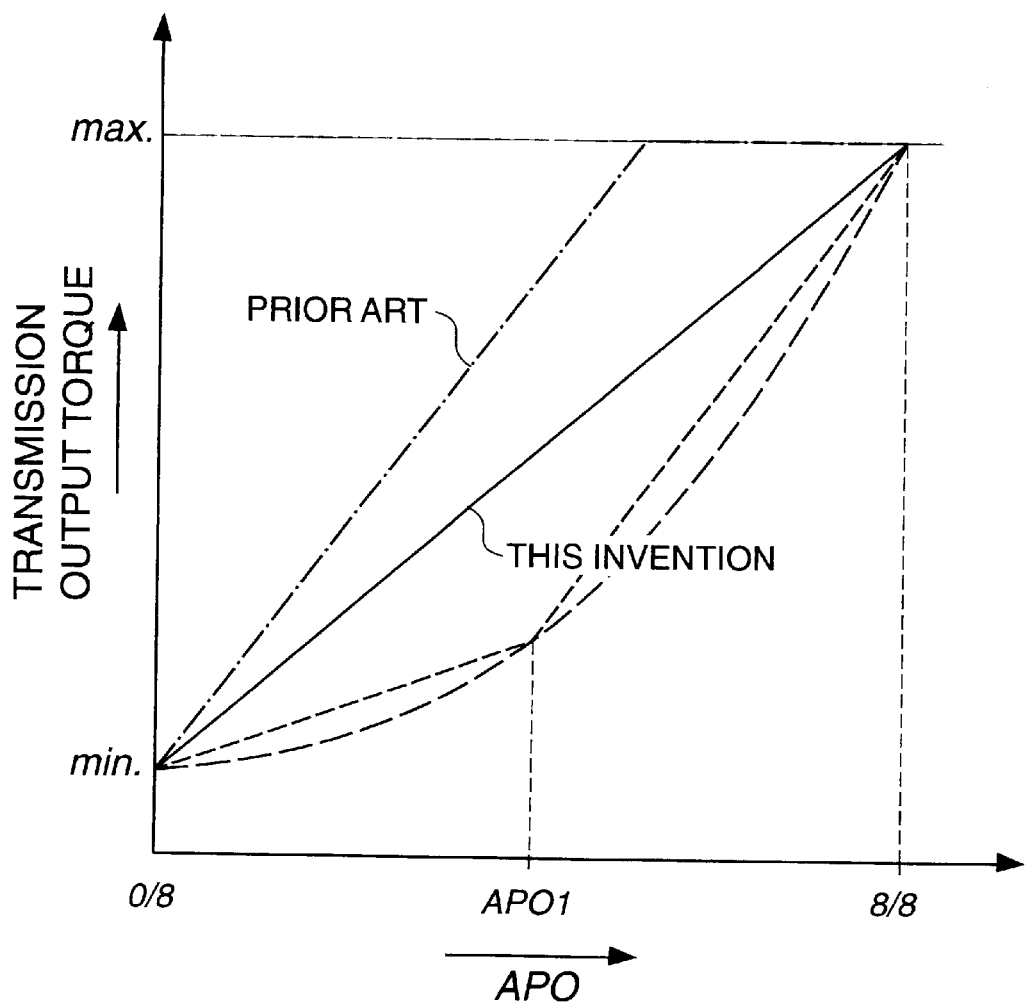
FIG. 5 is a diagram describing the characteristics of a target output torque of the automatic transmission set by the controller.

Referring to FIG. 5, when the accelerator pedal 25 is depressed with a high-speed gear applied in the hysteresis region, the output torque of the automatic transmission 5 is saturated before the accelerator pedal depression amount APO reaches the maximum value as shown by the dotted line in the figure. In order to prevent torque saturation, it is preferred to reduce the rate of increase in the output torque as shown by the solid line in the figure.

However, the upper limiting value of the output torque depends on the gear. This may result in the following problems. Even when the output torque of the automatic transmission 5 and the accelerator pedal depression amount APO are set in order to satisfy the above relation with respect to a specific gear, output torque may become saturated when the same setting is applied to a different gear. Alternatively, even when the accelerator pedal depression amount APO reaches the maximum value of 8/8, the output torque may not reach the maximum value.

As a result, different maps of the target output torque are applied to each gear of the automatic transmission 5 in order to prevent problems related to output torque. More precisely, at the same vehicle speed VSP and accelerator pedal depression amount APO, a target output torque set with respect to high-speed gears is smaller than a target output torque set with respect to low-speed gears.

Preferred variation in the output torque of the automatic transmission 5 is shown by a straight line in FIG. 5. However it is more preferable that the target output torque varies along a curved line or an refracted line as shown by the broken lines in the figure so that the rate of increase in output torque increases as the depression amount APO increases. Furthermore, it is possible to set the starting point for increase in the target output torque to a value of 1/8 or 2/8 rather than a value of APO=0. It is possible to set the above variation characteristics for each gear by applying a different target output torque map for each gear in addition to the maximum value for the target output torque. The controller 3 calculates a target engine torque tT based on the target output torque tF for the automatic transmission 5 set by the switching section 14 by referring to the map corresponding to the gear signal.

Figure 3B:
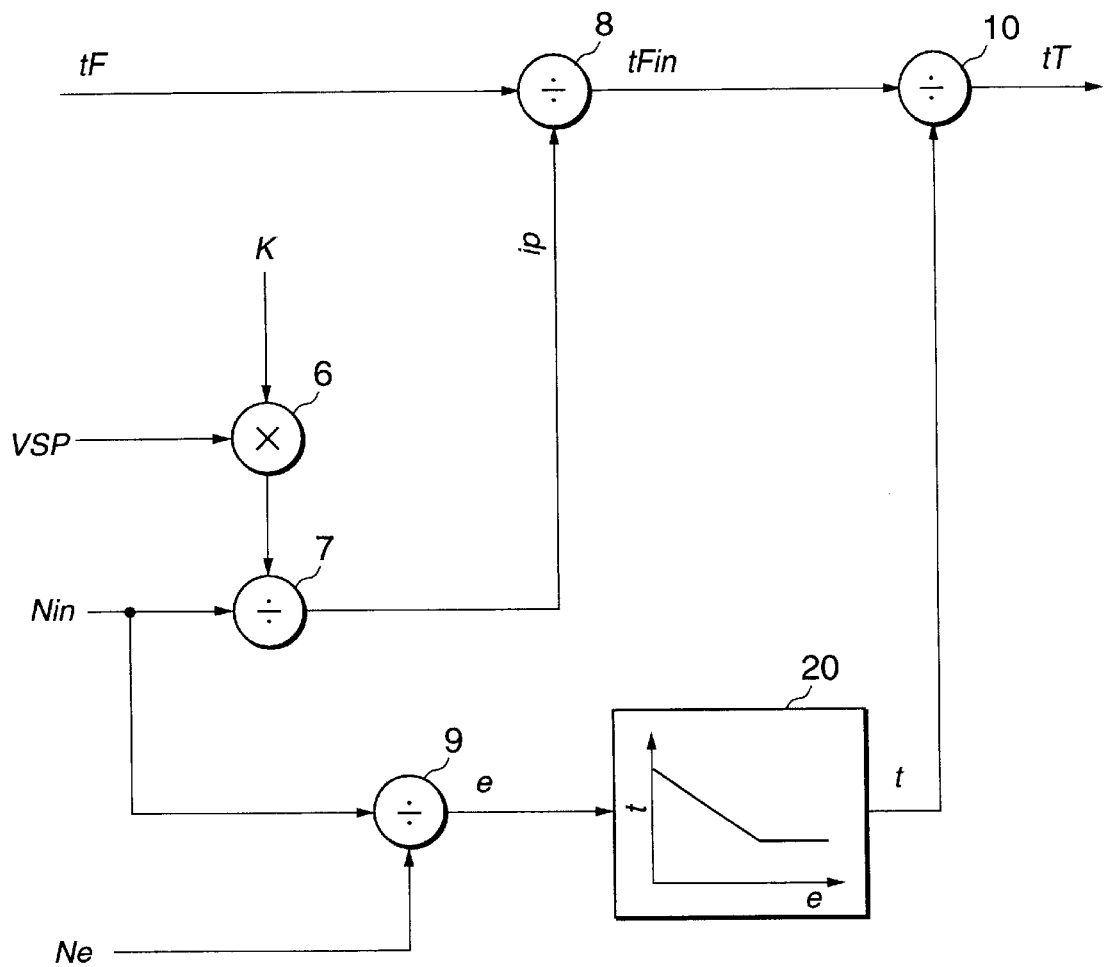

The process of calculating the target engine torque tT will be described referring to FIG. 3B.

The controller 3 firstly calculates an output shaft rotation speed Nout by multiplying a constant K by the vehicle speed VSP with a multiplier 6. Then the input shaft rotation speed Nin is divided by the output shaft rotation speed Nout with a divider 7 in order to calculate a real speed ratio ip of the automatic transmission 5. A slip rate e of the torque converter is calculated by dividing the input shaft rotation speed Nin by the engine rotation speed Ne with a divider 9. Consequently a torque amplification ratio t of the torque converter is calculated from the slip rate e of the torque converter by looking up a pre-stored map 20

The controller 3 converts the target output torque tF of the automatic transmission 5 set by the switching section 14 into a target input torque tFin of the automatic transmission 5 by division with the real speed ratio ip in a divider 8. Then the controller 3 calculates the target engine torque tT of the engine 4 by dividing the target input torque fFin with the torque amplification ratio t in a divider 10.

The controller 3 controls the throttle opening of the engine 4, the fuel supply amount to the engine 4 and the ignition timing of spark plugs provided in the engine 4 based on the target engine torque tT calculated in the above manner. In this way, the controller 3 controls the output torque of the engine 4 to coincide with the target engine torque tT. An electronic throttle performing electronic control of the opening independently of the operation of the accelerator pedal 25 is used as the throttle provided in the engine 4.

When any gear is applied by the automatic transmission 5, the above structure allows smooth increases in the output torque of the automatic transmission 5 without saturation according to depression of the accelerator pedal 25 and thus results in preferred acceleration characteristics.

A second embodiment of this invention will be described with reference to FIG. 6.

The hardware of this embodiment has the same structure as the first embodiment. It differs from the first embodiment only in that the switching section 14 determines the target output torque tF of the automatic transmission 5 by performing a switching routine shown in FIG. 6.

In the first embodiment, the switching controller 14 switches the target output torque tF of the automatic transmission 5 at the same time as a gearshift. Thus the target output torque tF varies in a stepwise manner with the gearshift.

Figure 6:
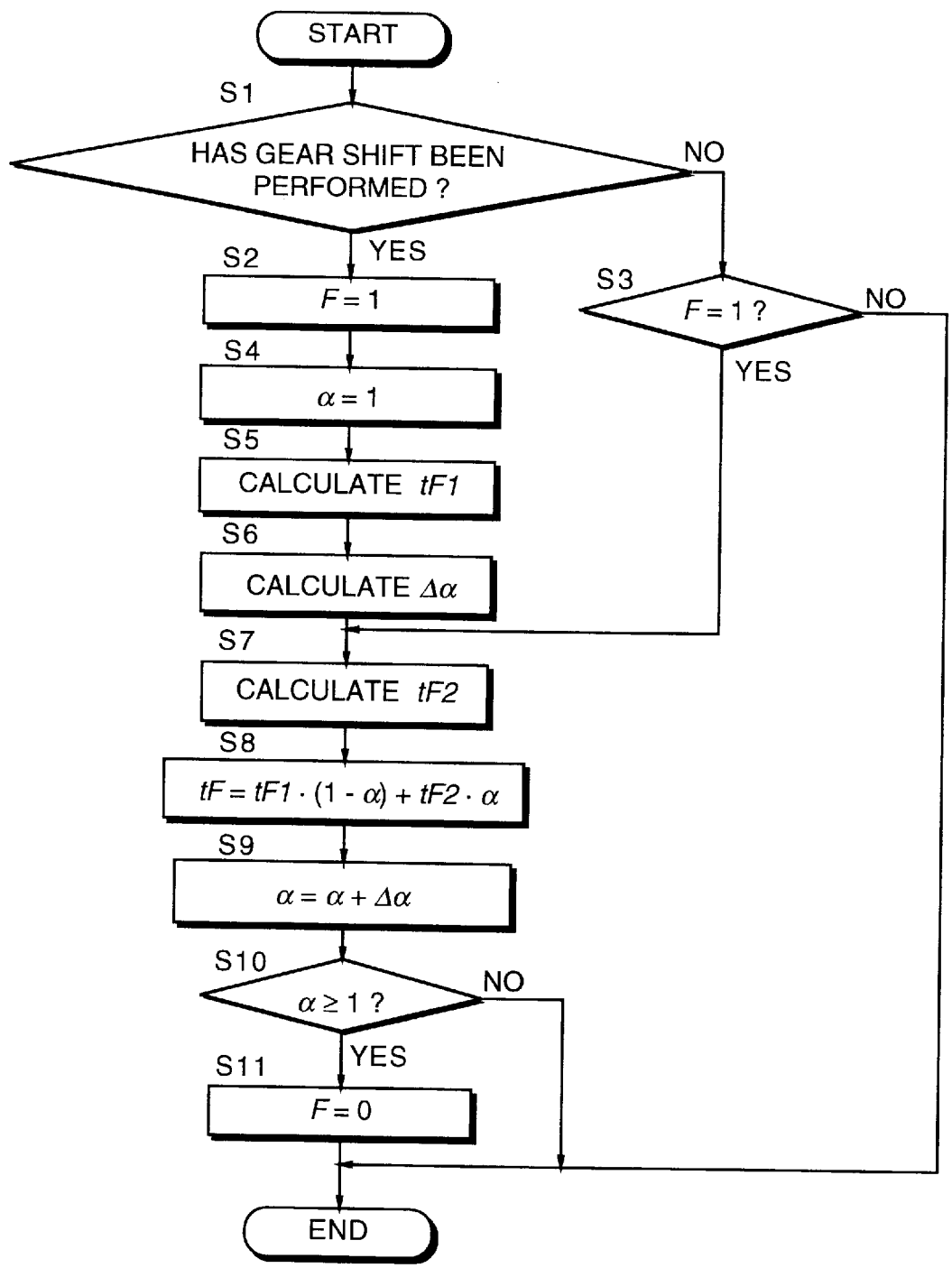
FIG. 6 is a flowchart describing a switching routine for the target output torque executed by the controller according to a second embodiment of this invention.

In contrast, the switching routine of FIG. 6 smoothes out variation in the target output torque tF. The routine is executed at ten millisecond intervals by the switching section 14 while the vehicle is running.

Referring to FIG. 6, firstly in a step S1, the switching section 14 determines whether or not the automatic transmission 5 has performed a gear shift after executing the routine on the immediately previous occasion based on the gear signal from the inhibitor switch 26. When a gearshift has been executed, the routine proceeds to a step S2 and the gear shift flag F is set to a value of one. The gear shift flag F is a flag which shows whether or not the present occasion is in a transient period for shifting target output torque tF after a gear shift.

In a next step S4, a coefficient α is set to zero.

In a next step S5, a target output torque tF1 of the automatic transmission 5 is calculated by looking up a map corresponding to the gear applied before the gear shift.

In a next step S6, an increment Δα of the coefficient α is calculated based on the vehicle speed VSP and gears applied before and after the gear shift by looking up a map pre-stored in the controller 3. As the value for the increment Δα is smaller, the variation in the target output torque tF is delayed. In other words, the transient period for shifting the target output torque tF becomes longer. After the process in the step S6, the routine proceeds to a step S7. In the steps S7 to S11, a target output torque tF during the transient period is calculated.

The process in the steps S2 and S4–S6 is executed only in the first occasion the routine is executed after the gearshift. The process in the steps S7 to S11 is repeated during the transient period.

When it is determined that a gearshift has not been performed in the step S1, the routine determines whether or not the gearshift flag F has a value of one in a step S3. When the gear shift flag F has a value of one, it shows that a gear shift has been executed and that the present occasion is in the transient period. When the gear shift flag F has a value of one, the routine proceeds to the step S7. When the gear shift flag F does not have a value of one, it means that the present occasion is not in the transient period. In this case, since it is not necessary to perform a shift process on the target output torque tF, all subsequent steps are skipped and the routine is terminated.

In the step S7, a target output torque tF2 of the automatic transmission 5 is calculated by looking up a map corresponding to the currently applied gear based on the gear signal.

In the step S8, a target output torque tF is calculated from Equation (1).

$$tF = tF1 \cdot (1-\alpha) + tF2 \cdot \alpha \quad (1)$$

In the step S9, in order to execute the routine on a subsequent occasion, a new value for the coefficient α is calculated by adding the increment Δα to the previous value of a. The newly calculated value for the coefficient α is stored in the RAM of the controller 3.

In the next step S10, it is determined whether or not the value for the coefficient α calculated in the step S9 is not less than one.

When the coefficient α has a value of one, the target output torque tF in the Equation (1) equals tF2. In other words, the transient period terminates when the coefficient α equals one. Thus when the coefficient α is not less than one in the step S10, the routine resets the gear shift flag F to a value of zero in the step S11 and the routine is terminated.

When the coefficient α is smaller than one in the step S10, it means that the transient period has not been terminated. In this case, the routine terminates without proceeding to the step S11. In this case, the gear shift flag F remains at a value of one.

The target output torque tF varies from the target output torque tF1 before gearshift towards the target output torque tF2 after the gearshift and the coefficient α gradually shifts from zero to one. As a consequence, Equation (1) undergoes gradual variation. Thus it is possible to prevent torque shock due to gearshift by executing this routine.

A third embodiment of this invention will be described with reference to FIG. 7.

This embodiment represents a substitution for the routine of FIG. 6 according to the second embodiment. In this embodiment, the switching section 14 executes the routine shown in FIG. 7.

Figure 7:
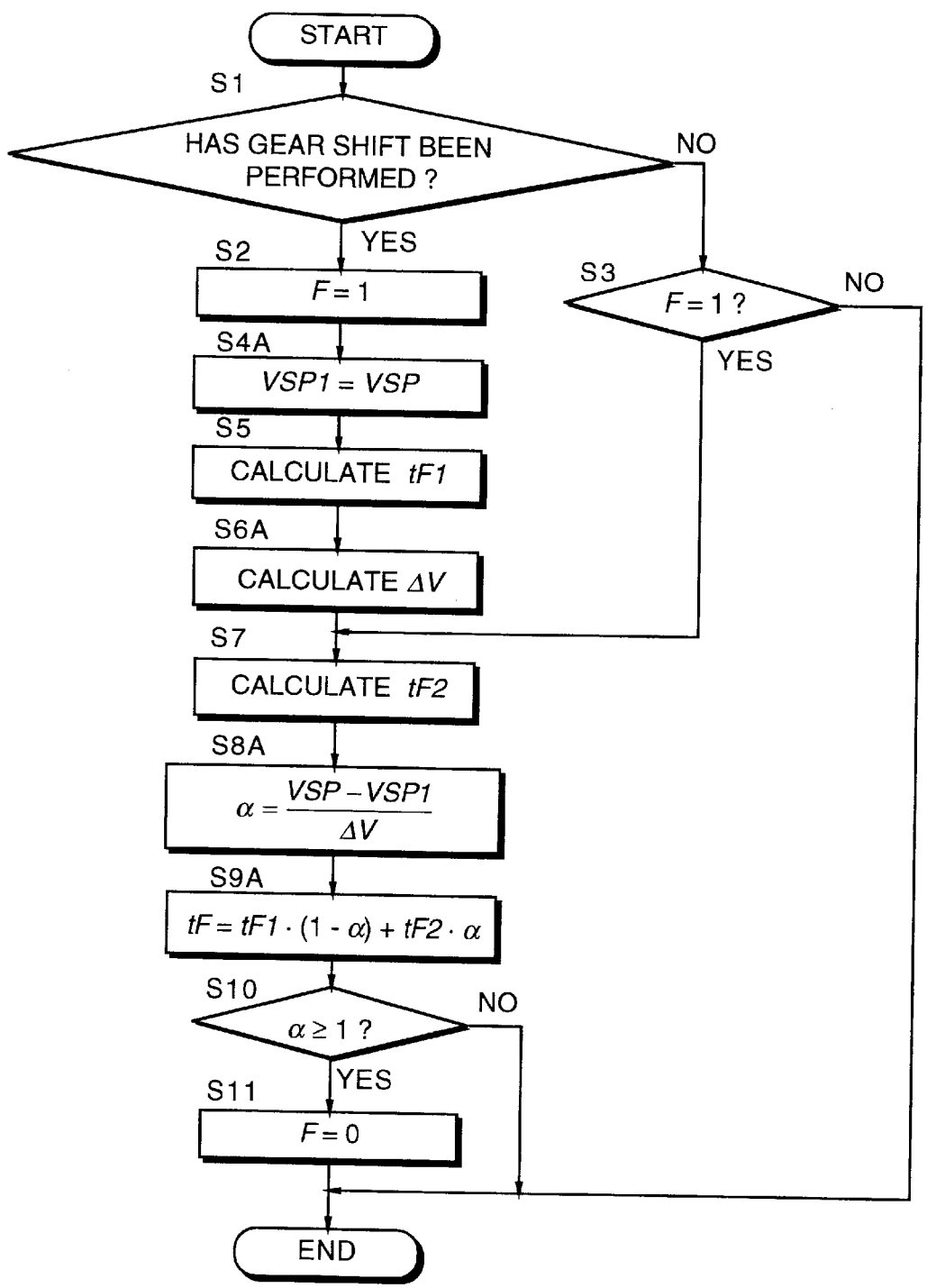
FIG. 7 is similar to FIG. 6, but showing a third embodiment of this invention.

The difference between the routine shown in FIG. 7 and the routine shown in FIG. 6 relates to the calculation process for the coefficient α.

In the routine shown in FIG. 7, the steps S4A, S6A, S8A, S9A are provided instead of the steps S4, S6, S8, S9

The process in the steps S2, S4A, S5 and S6A is only performed during the first occasion the routine is performed after a gearshift. In the step S4A, the current vehicle speed VSP is set as a vehicle speed VSP1 during gear shift.

In the step S6A, an increment ΔV for the vehicle speed VSP is calculated based on the vehicle speed VSP and gears applied before and after the gear shift by looking up a map which is pre-stored in the controller 3. The increment ΔV shows variation in the vehicle speed which is predicted as a result of the gearshift.

The increment ΔV takes a positive value when the automatic transmission 5 undergoes an upshift and takes a negative value when the automatic transmission 5 undergoes a downshift.

The coefficient α is calculated from Equation (2) in the step S8A.

$$\alpha = (VSP - VSP1)/\Delta V \quad (2)$$

In the step S9A, the target output torque tF is calculated from Equation (1) above.

In this routine, the coefficient α is increased according to variation in the vehicle speed VSP instead of being incremented by the fixed increment Δα. Other steps of this routine are the same as the routine of FIG. 6.

A fourth embodiment of this invention will be described with reference to FIGS. 8 to 10.

In this embodiment, the internal structure of the controller 3 differs from that described with reference to the first embodiment.

Figure 8:
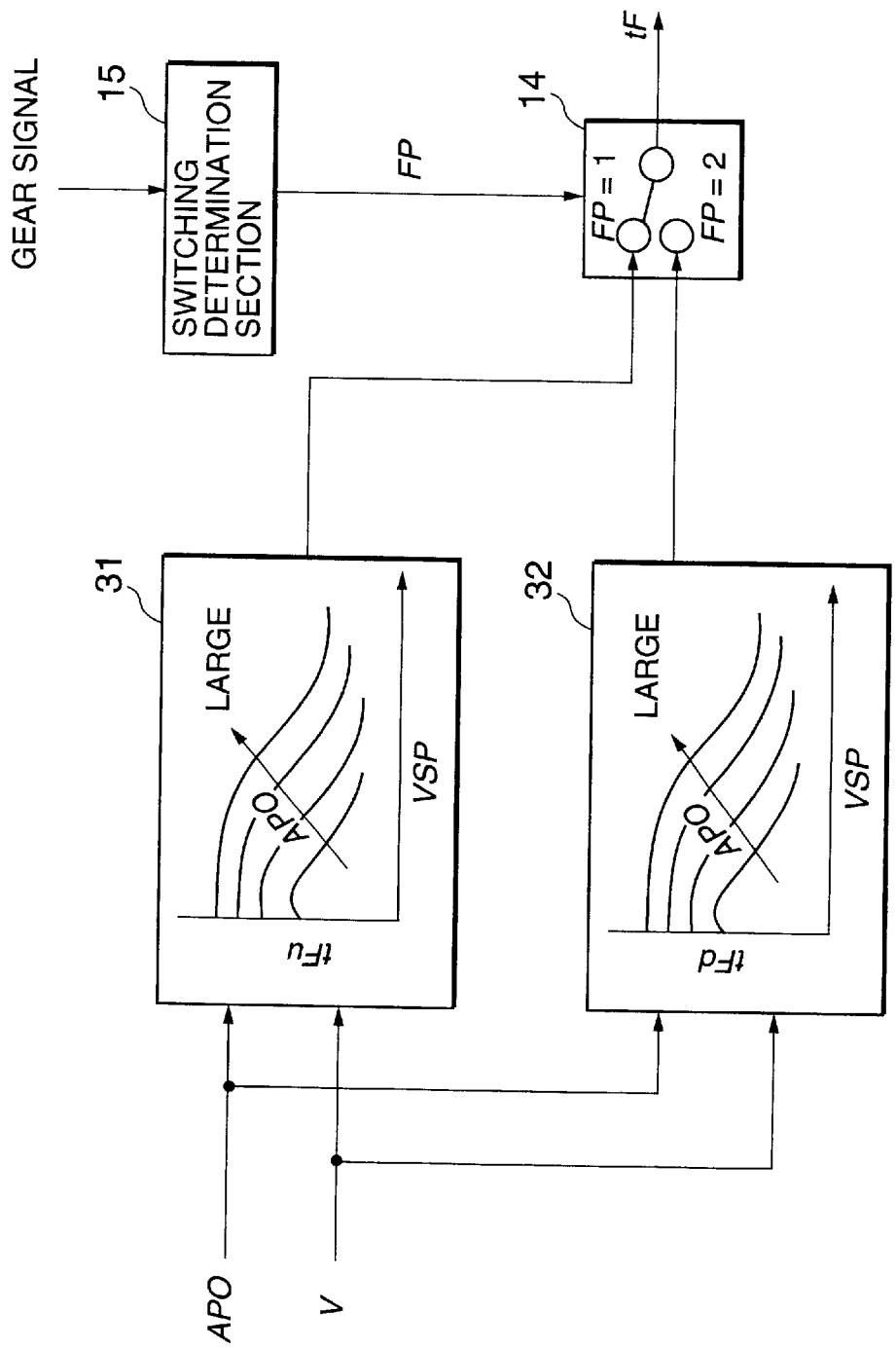
FIG. 8 is a block diagram describing the process of engine output control performed by the controller according to a fourth embodiment of this invention.

Referring to FIG. 8, instead of having a map of the target output torque tF for each gear of the automatic transmission 5, the controller 3 is only provided with two maps 31 and 32. The controller 3 is provided with a switching determination section 15 for executing a switching determination routine shown in FIG. 10.

Figure 9:
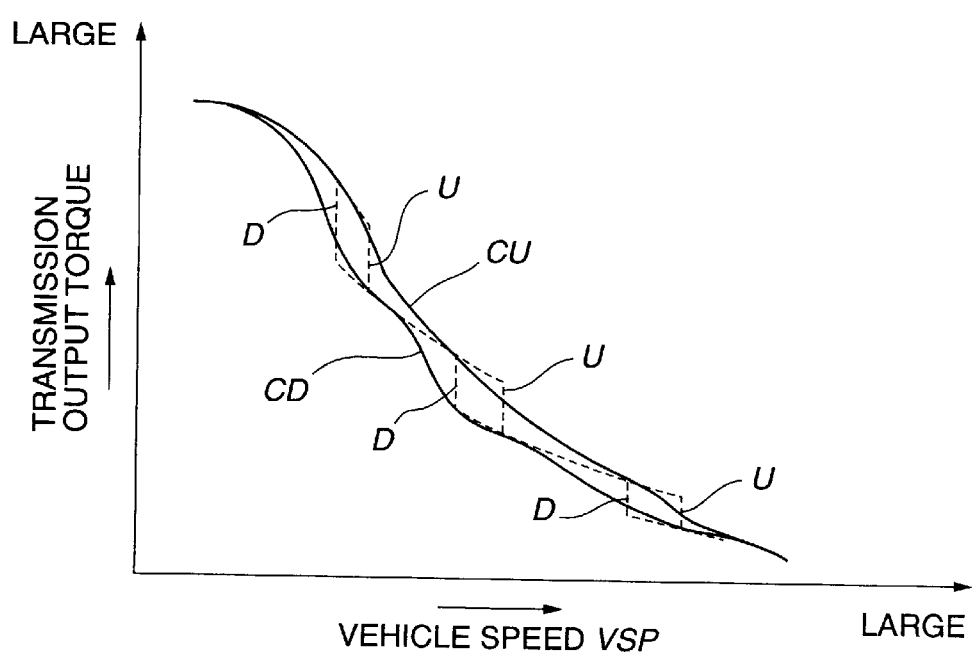
FIG. 9 is a diagram describing the setting of the target output torque of the automatic transmission according to the fourth embodiment of this invention.

This control will be outlined with reference to FIG. 9.

The curved line CU in FIG. 9 corresponds to the line U joined into a gently curving line. The line U shows the variation in the output torque of the automatic transmission 5 during an upshift as shown in FIG. 4. The curved line CD corresponds to the line D joined into a gently curving line. The line D shows the variation in the output torque of the automatic transmission 5 during a downshift as shown in FIG. 4.

In this embodiment, a plurality of curved lines CU and CD are prepared corresponding to the accelerator pedal depression amount APO. The target output torque tF of the automatic transmission 5 is optimized by applying either the curved line CU or CD according to the direction of shift in the automatic transmission 5.

The map 31 shown in FIG. 8 is a collection of curved lines CU according to various accelerator pedal depression amounts APO. The map 32 is a collection of curved lines CD according to various accelerator pedal depression amounts APO.

The switching determination routine for switching over the maps 31 and 32 performed by the switching determination section 15 will be described with reference to FIG. 10. This routine is executed at ten millisecond intervals while the vehicle is running.

The switching determination section 15 determines whether or not the present running condition of the vehicle is in a hysteresis region between the first and the second gear based on the vehicle speed VSP and the accelerator depression amount APO.

When the present running condition is in the hysteresis region between the first and the second gear, the routine proceeds to a step S22.

In the step S22, it is determined whether or not the currently applied gear in the automatic transmission 5 is the first gear. When the current applied gear is the first gear, the routine is terminated after the switching flag FP is set to a value of one in a step S24.

The switching flag FP is set to a value of one or two. FP=1 means an upshift and FP=2 means a downshift. The initial value of the switching flag is one.

In the step S22, when the currently applied gear of the transmission 5 is not the first gear, after the switching flag FP is set to a value of two in the step S25, the routine is terminated.

In the step S21, when it is determined that the present running condition of the vehicle is not in the hysteresis region between the first gear and the second gear, the routine proceeds to a step S23.

In the step S23, it is determined whether or not the present running condition of the vehicle is in a hysteresis region between the second gear and the third gear. When the present running condition of the vehicle is in the hysteresis region between the second gear and the third gear, it is determined in a step S26 whether or not the currently applied gear of the automatic transmission 5 is the second gear. When the currently applied gear of the automatic transmission 5 is the second gear, the switching flag FP is set to one in the step S24 and the routine is terminated. When the currently applied gear of the automatic transmission 5 is not the second gear, the switching flag FP is set to two in the step S25 and the routine is terminated.

In the step S23, when it is determined that the present running condition of the vehicle is not in the hysteresis region between the second gear and the third gear, the routine proceeds to a step S27.

In the step S27, it is determined whether or not the present running condition of the vehicle is in a hysteresis region between the third gear and the fourth gear. When the present running condition of the vehicle is in the hysteresis region between the third gear and the fourth gear, in a step S28, it is determined whether or not the currently applied gear of the automatic transmission 5 is the third gear. When the currently applied gear of the automatic transmission 5 is the third gear, the switching flag FP is set to a value of one in the step S24 and the routine is terminated. When the currently applied gear of the automatic transmission 5 is not the third gear, the switching flag FP is set to a value of two in the step S25 and the routine is terminated.

In the step S27, when it is determined that the present running condition of the vehicle is not in the hysteresis region between the third gear and the fourth gear, it means that the present running condition of the vehicle does not correspond to any of the hysteresis regions. In this case, the routine is terminated without setting the switching flag FP. As a result, when outside the hysteresis regions, the value of the switching flag FP set previously by the routine is retained.

When FP=1, the switching section 14 shown in FIG. 8 sets the target output torque tFu for upshift obtained from the map 31 to the target output torque tF of the automatic transmission 5When FP=2, the target output torque tFd for downshift obtained from the map 32 is set to the target output torque tF for the automatic transmission 5.

Figure 10:
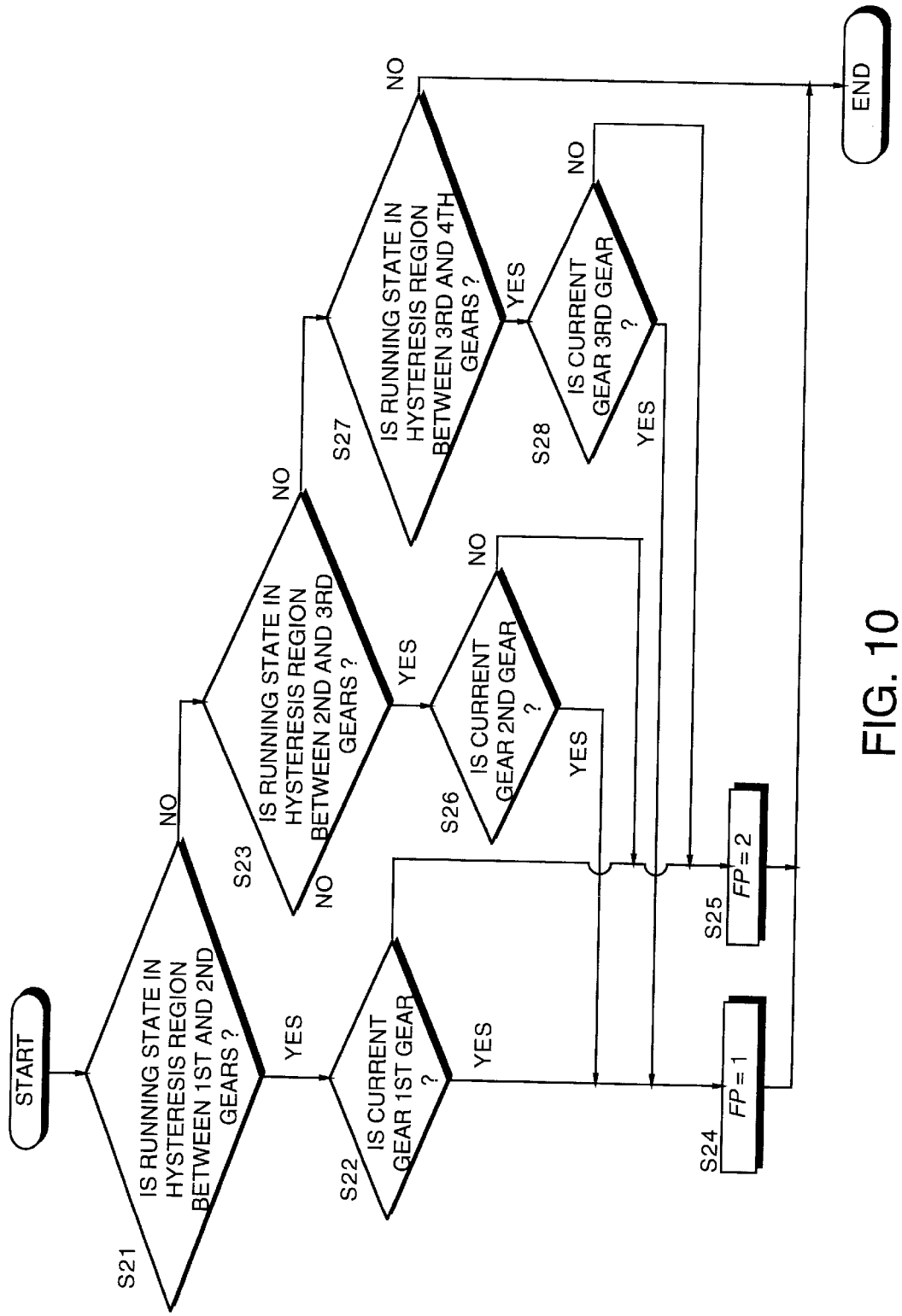
FIG. 10 is a flowchart describing a switching determination routine executed by the controller according to the fourth embodiment of this invention.

The routine of FIG. 10 is based on the following analysis. When a low-speed gear is selected in a hysteresis region, the above settings increase the probability that the automatic transmission 5 will perform an upshift. When a high-speed gear is selected in a hysteresis region, the probability that the automatic transmission 5 will perform a downshift is increased.

In the hysteresis regions, the two types of gears comprising high-speed and low-speed gears are selectively applied according to the direction of shift in the automatic transmission 5 with respect to the same vehicle speed VSP and accelerator pedal depression amount APO. Thus in this region, when the target output torque tF is determined only with respect to the vehicle speed VSP and the accelerator pedal depression amount APO, an excess/deficiency results in the target output torque tF of the automatic transmission 5 depending on the gear applied by the automatic transmission 5.

In this embodiment, it is possible to obtain an optimal vehicle drive force corresponding to the depression amount of the accelerator pedal 25 even in the hysteresis region by setting the target output torque tF which differs depending on the selected gear.

When the switching section 14 switches the target output torque tF, it is also possible to perform gradual switching as in the second and third embodiments.

A fifth embodiment of this invention will be described with reference to FIG. 11.

Figure 11:
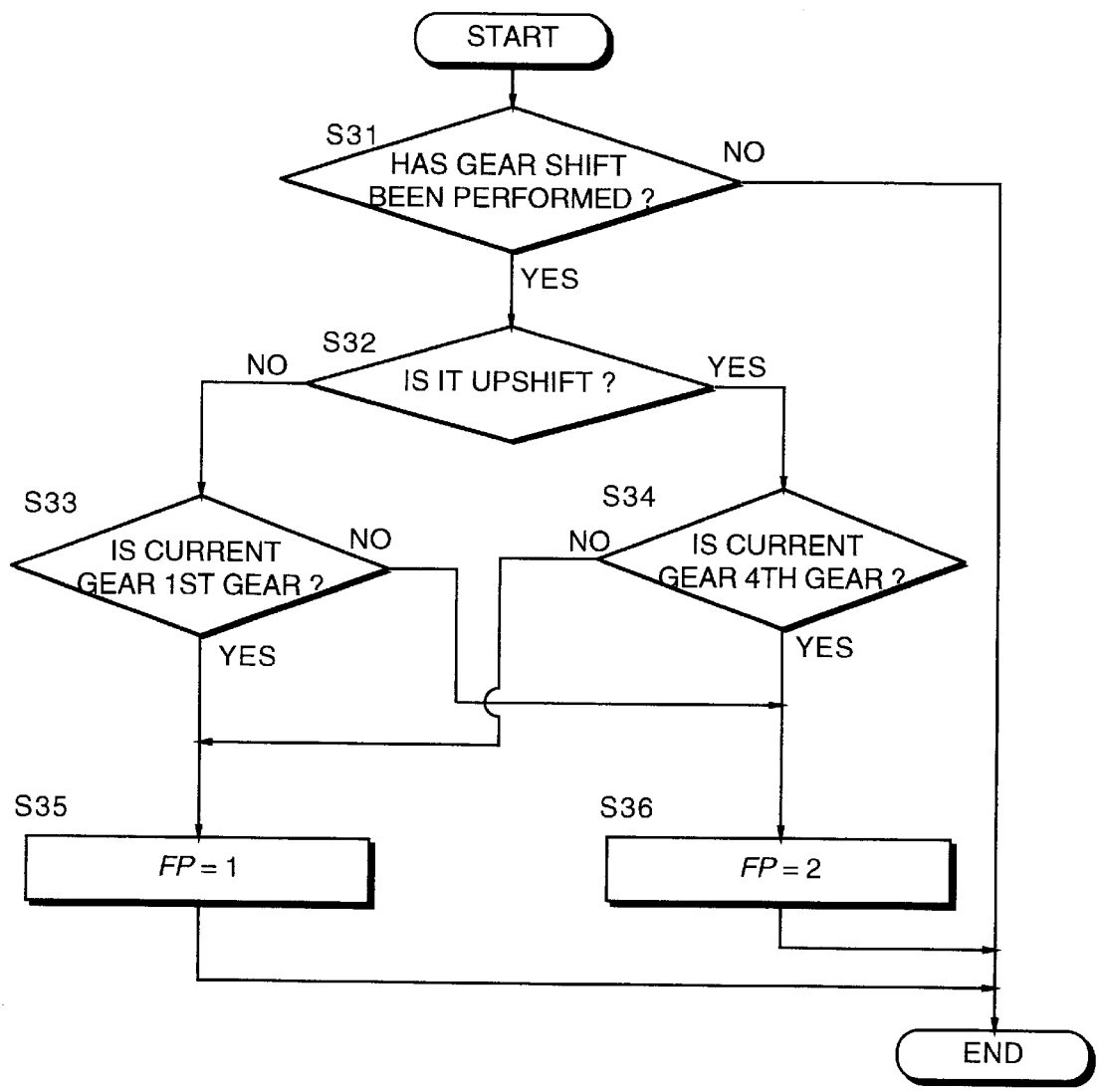
FIG. 11 is a flowchart describing a switching determination routine executed by the controller according to a fifth embodiment of this invention.

In this embodiment, the routine shown in FIG. 11 is executed instead of the routine of FIG. 10 that is executed by the switching determination section 15 in the fourth embodiment. In other respects, this embodiment is identical to the fourth embodiment. This routine is also performed at intervals of ten milliseconds while the vehicle is running.

Referring to FIG. 11, in a step S31, the switching determination section 15 determines whether or not the automatic transmission 5 has performed a gear shift after the routine was executed on the immediately previous occasion based on the gear signal from the inhibitor switch 26. When a gearshift has been performed, the routine proceeds to a step S32 and it is determined whether or not the executed gearshift is an upshift. On the other hand, when it is determined that a gearshift has not been performed in the step S31, the routine does not proceed to subsequent steps and is terminated at that point.

When it is determined in the step S32 that the gearshift is an upshift, the routine determines whether or not the currently applied gear is the fourth gear in a step S34. When the currently applied gear is the fourth gear, after the switching flag FP is set to a value of two in a step S36, the routine is terminated. When the currently applied gear is not the fourth gear, after the switching flag FP is set to a value of one in a step S35 the routine is terminated. In the step S32, when the gearshift is not an upshift, it means that a downshift has been performed. In this case, the routine determines in a step S33 whether or not the currently applied gear is the first gear. When the currently applied gear is the first gear, the switching flag FP is set to a value of one in the step S35 and the routine is terminated. When the currently applied gear is not the first gear, the switching flag FP is set to a value of two in the step S36 and the routine is terminated.

The initial value of the switching flag FP is taken to be one in the same manner as the fourth embodiment.

According to this routine, immediately after an upshift from the third gear to the fourth gear, the switching flag FP is set to a value of two and the switching section 14 sets the target output torque tFd for downshift which is obtained from the map 32 to the target output torque tF of the automatic transmission 5. When an upshift is performed between other gears, the switching flag FP is set to one and the switching section 14 sets the target output torque tFu for upshift which is obtained from the map 31 to the target output torque tF of the automatic transmission 5.

On the other hand, immediately after a downshift from the second gear to the first gear, the switching flag FP is set to a value of one and the switching section 14 sets the target output torque tFu for upshift which is obtained from the map 31 to the target output torque tF of the automatic transmission 5. When a downshift is performed between other gears, the switching flag FP is set to two and the switching section 14 sets the target output torque tFd for downshift which is obtained from the map 32 to the target output torque tF of the automatic transmission 5.

Generally shift operations of the automatic transmission 5 are performed continuously in the same direction. For example, during acceleration after the vehicle start, sequential upshift operations are performed from the first gear to the fourth gear. In consideration that the gear shift is most likely to be performed sequentially, it is assumed that an upshift operation will be followed an upshift operation and a downshift operation will be followed by a downshift operation in this embodiment. As a result, the target output torque tF is set according to the direction of shift on the immediately previous occasion. The reason that the target output torque tFd for downshift is set as the target output torque tF when the fourth gear is applied is due to the fact that shift operations from the fourth gear are limited to the downshift operation. The reason that the target output torque tFu for upshift is set as the target output torque tF when the first gear is applied is due to the fact that shift operations from the first gear are limited to the upshift operation.

According to this embodiment, use of a simple algorithm makes it possible to obtain an optical vehicle drive force according to the depression amount of the accelerator pedal 25 in the hysteresis regions at a high probability In this embodiment, it is also possible to apply a gradually switching operation as in the second and third embodiments when the switching section 14 switches the target output torque tF.

The contents of Tokugan 2000-363131, with a filing date of Nov. 29, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A vehicle drive system, comprising:
   an accelerator pedal;
   a sensor which detects a vehicle speed;
   a sensor which detects a depression amount of the accelerator pedal;
   an engine varying an output torque in response to a signal;
   an automatic transmission converting the output torque of the engine into a drive torque of a vehicle, the transmission being provided with a first gear and a second gear which has a smaller speed reduction ratio than the first gear, the first gear and second gear being selectively applied according to the depression amount and the vehicle speed;
   a sensor which detects the gear applied by the automatic transmission; and
   a programmable controller programmed to:
      store a first map prescribing a transmission target output torque with the first gear according to the depression amount and the vehicle speed, and a second map prescribing the transmission target output torque with the second gear according to the depression amount and the vehicle speed, the transmission target output torque prescribed by the first map being larger than the transmission target output torque prescribed by the second map with respect to the same vehicle speed and the same depression amount;
      calculate the transmission target output torque based on the vehicle speed and the depression amount by looking up either of the first map and second map corresponding to the gear which is applied by the automatic transmission;
      calculate an engine target output torque based on the transmission target output torque; and
      output the signal corresponding to the engine target output torque to the engine.

2. The vehicle drive system as defined in claim 1, wherein the automatic transmission executes an upshift operation from the first gear to the second gear at a vehicle speed higher than the vehicle speed at which a downshift operation from the second gear to the first gear occurs for a given depression amount of the accelerator pedal.

3. The vehicle drive system as defined in claim 1, wherein the controller is further programmed to vary the transmission target output torque gradually in response to a gear shift between the first gear and the second gear in the automatic transmission.

4. The vehicle drive system as defined in claim 1, wherein the automatic transmission is provided with more than three gears which have different speed reduction ratios and are applied sequentially in response to the vehicle speed and the depression amount, and the controller is further programmed to store maps for the respective gears according to which the transmission target output torque becomes larger as the speed reduction ratio of the gear become larger.

5. The vehicle drive system as defined in claim 1, wherein the automatic transmission is provided with more than three gears which have different speed reduction ratios and are applied sequentially according to the vehicle speed and the depression amount, an upshift operation shifting from a gear to another gear with a smaller speed reduction ratio is performed at a higher vehicle speed than a downshift operation shifting the same gears in an opposite direction at a given depression amount of the accelerator pedal, and the controller is further programmed to determine whether or not an operating state of the automatic transmission is in a hysteresis region between an upshift timing and a downshift timing based on the vehicle speed and the depression amount, determine, when the operating state is in the hysteresis region, whether or not a gear applied by the automatic transmission is a gear with a smaller speed reduction ratio of two gears related to the hysteresis region, calculate the transmission target output torque by looking up the second map when the operating state is in the hysteresis region and the gear applied by the transmission has the smaller speed reduction ratio, and calculate the transmission target output torque by looking up the first map when the operating state is in the hysteresis region and the gear applied by the transmission does not have the smaller speed reduction ratio.

6. The vehicle drive system as defined in claim 1, wherein the automatic transmission is provided with more than three gears which have different speed reduction ratios and are applied sequentially according to the vehicle speed and the depression amount, an upshift operation shifting from a gear to another gear with a smaller speed reduction ratio is performed at a higher vehicle speed than a downshift operation shifting the same gears in an opposite direction at a given depression amount of the accelerator pedal, and the programmable controller is further programmed to detect the upshift operation and the downshift operation from a variation in the gear applied by the automatic transmission and calculate the transmission target output torque by looking up the first map after the upshift operation, and calculate the transmission target output torque by looking up the second map after the downshift operation.

7. The vehicle drive system as defined in claim 6, wherein the controller is further programmed to determine whether or not the gear applied by the automatic transmission after the downshift operation is a gear with a largest speed reduction ratio, and calculate the transmission target output torque by looking up the first map when the gear applied by the automatic transmission after the downshift operation is the gear with the largest speed reduction ratio.

8. The vehicle drive system as defined in claim 6, wherein the controller is further programmed to determine whether or not the gear applied by the automatic transmission after the upshift operation is a gear with a smallest speed reduction ratio, and calculate the transmission target output torque by looking up the second map when the gear applied by the automatic transmission after the downshift operation is the gear with the smallest speed reduction ratio.

9. A vehicle drive system, comprising:
   an accelerator pedal;
   means for detecting a vehicle speed;

means for detecting a depression amount of the accelerator pedal;

an engine varying an output torque in response to a signal;

an automatic transmission converting the output torque of the engine into a drive torque of a vehicle, the transmission being provided with a first gear and a second gear which has a smaller speed reduction ratio than the first gear, the first gear and second gear being selectively applied according to the depression amount and the vehicle speed;

means for detecting the gear applied by the automatic transmission;

means for storing a first map prescribing a transmission target output torque with the first gear according to the depression amount and the vehicle speed, means for storing a second map prescribing the transmission target output torque with the second gear according to the depression amount and the vehicle speed, the transmission target output torque prescribed by the first map being larger than the transmission target output torque prescribed by the second map with respect to the same vehicle speed and the same depression amount;

means for calculating the transmission target output torque based on the vehicle speed and the depression amount by looking up either of the first map and second map corresponding to the gear which is applied by the automatic transmission;

means for calculating an engine target output torque based on the transmission target output torque; and means for outputting the signal corresponding to the engine target output torque to the engine.

* * * * *